(12) United States Patent
Knoop

(10) Patent No.: US 8,691,452 B2
(45) Date of Patent: Apr. 8, 2014

(54) APPARATUS FOR RECIRCULATION OF A CATHODE GAS IN A FUEL CELL ARRANGEMENT, METHOD FOR SHUTTING DOWN SUCH A FUEL CELL ARRANGEMENT

(75) Inventor: Andreas Knoop, Esslingen (DE)

(73) Assignee: Daimler AG, Stuttgart (DE)

( * ) Notice: Subject to any disclaimer, the term of this patent is extended or adjusted under 35 U.S.C. 154(b) by 755 days.

(21) Appl. No.: 12/670,824

(22) PCT Filed: Jun. 19, 2008

(86) PCT No.: PCT/EP2008/004931
§ 371 (c)(1),
(2), (4) Date: Nov. 15, 2010

(87) PCT Pub. No.: WO2009/012854
PCT Pub. Date: Jan. 29, 2009

(65) Prior Publication Data
US 2011/0045368 A1   Feb. 24, 2011

(30) Foreign Application Priority Data
Jul. 26, 2007  (DE) .......................... 10 2007 035 056

(51) Int. Cl.
*H01M 8/04* (2006.01)
*H01M 8/06* (2006.01)

(52) U.S. Cl.
USPC ......................................... 429/415; 429/429

(58) Field of Classification Search
None
See application file for complete search history.

(56) References Cited

U.S. PATENT DOCUMENTS

| | | | |
|---|---|---|---|
| 7,595,123 B2 | 9/2009 | Sone et al. | |
| 2001/0031386 A1* | 10/2001 | Sugawara | 429/19 |
| 2002/0150805 A1* | 10/2002 | Stenersen et al. | 429/34 |
| 2003/0219636 A1 | 11/2003 | Kaufmann | |
| 2006/0013703 A1 | 1/2006 | Yokozawa et al. | |
| 2007/0087233 A1 | 4/2007 | Blaszczyk et al. | |
| 2007/0154752 A1 | 7/2007 | McElroy et al. | |
| 2008/0053808 A1* | 3/2008 | Peffley et al. | 200/400 |
| 2008/0187788 A1* | 8/2008 | Fellows et al. | 429/13 |

FOREIGN PATENT DOCUMENTS

| | | |
|---|---|---|
| DE | 102 03 029 A1 | 7/2003 |
| DE | 102 04 787 A1 | 8/2003 |
| DE | 103 28 246 A1 | 1/2005 |
| DE | 103 25 196 B3 | 2/2005 |

(Continued)

OTHER PUBLICATIONS

Machine translation of JP 2002156057, May 2002.*

(Continued)

*Primary Examiner* — Jonathan Crepeau
(74) *Attorney, Agent, or Firm* — Crowell & Moring LLP

(57) ABSTRACT

An apparatus for recirculation of a cathode gas in a fuel cell arrangement having a cathode gas supply for supplying the cathode gas to a cathode area, and a cathode gas outlet for carrying the partially consumed cathode gas out of the cathode area, includes a recirculation line for recirculation of the partially consumed cathode gas from a junction point in the cathode gas outlet into a supply point in the cathode gas supply. Blocking apparatus is provided to block the cathode gas supply in the flow direction upstream of the supply point and to block the cathode gas outlet in the flow direction downstream from the junction point, such that a closed circuit for the partially consumed cathode gas is formed when the blocking apparatus is closed.

11 Claims, 1 Drawing Sheet

(56) References Cited

FOREIGN PATENT DOCUMENTS

| | | |
|---|---|---|
| JP | 2002-156057 A | 5/2002 |
| JP | 2003-42330 A | 2/2003 |
| JP | 2004-22487 A | 1/2004 |
| JP | 2005-100846 A | 4/2005 |
| JP | 2005-197065 A | 7/2005 |
| JP | 2006-29189 A | 2/2006 |
| JP | 2006-185904 A | 7/2006 |
| JP | 2006-302627 A | 11/2006 |
| JP | 2007-78028 A | 3/2007 |
| WO | WO 2005/018017 A2 | 2/2005 |

OTHER PUBLICATIONS

International Search Report dated Sep. 23, 2008 (PCT/ISA/210), including Forms PCT/ISA/220, and Form PCT/ISA/237 (Eleven (11) pages).

Translation of Japanese Office Action dated Jun. 13, 2012 cited as "C2" in Information Disclosure Statement filed on Sep. 4, 2012 (three (3) pages).

Japanese Office Action with English translation thereof dated Mar. 26, 2013 {Seven (7) pages}.

* cited by examiner

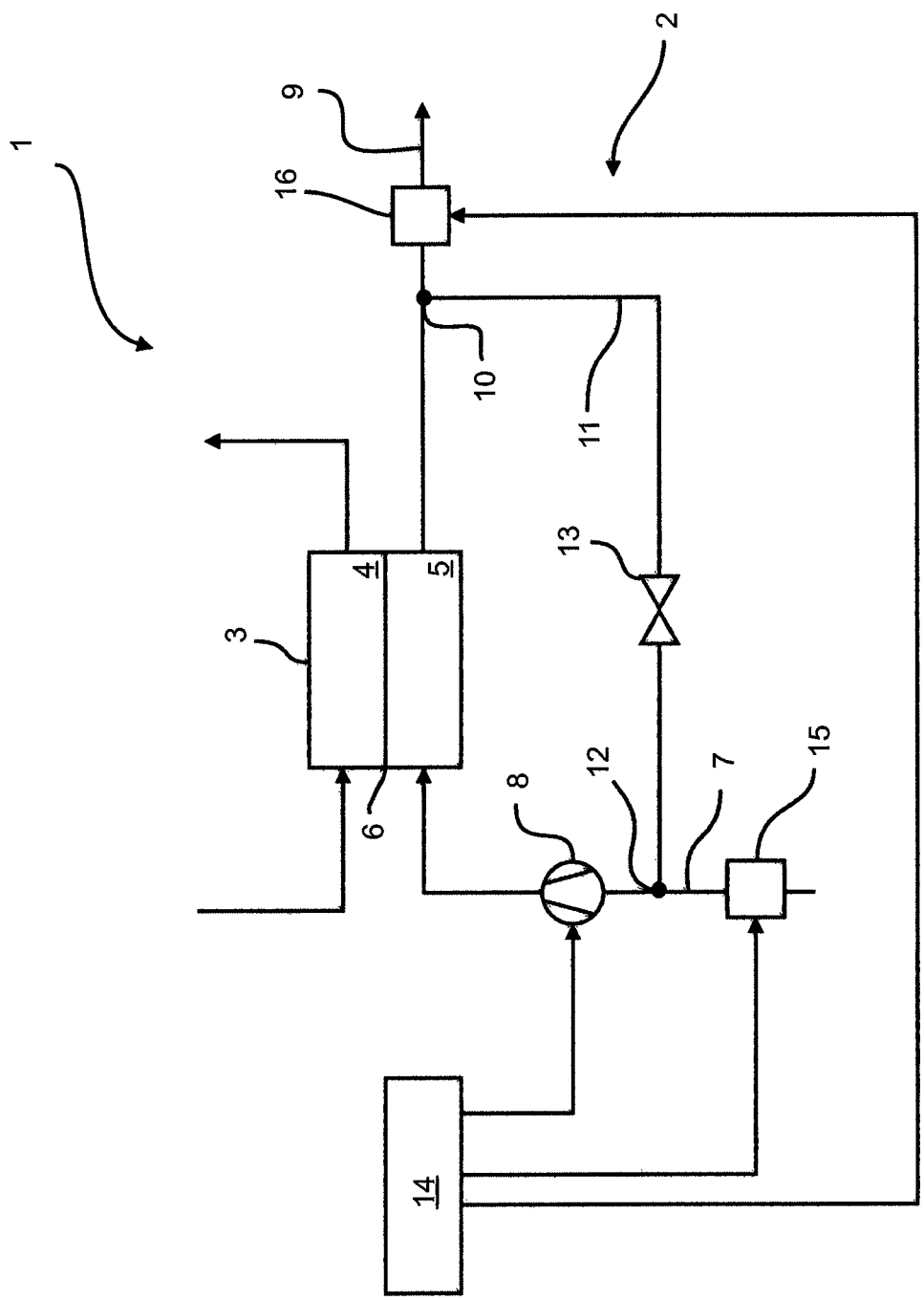

APPARATUS FOR RECIRCULATION OF A CATHODE GAS IN A FUEL CELL ARRANGEMENT, METHOD FOR SHUTTING DOWN SUCH A FUEL CELL ARRANGEMENT

This application is a national stage of PCT International Application No. PCT/EP2008/004931, filed Jun. 19, 2008, which claims priority under 35 U.S.C. §119 to German Patent Application No. 102007035056.4, filed Jul. 26, 2007, the entire disclosure of which is herein expressly incorporated by reference.

BACKGROUND AND SUMMARY OF THE INVENTION

The invention relates to an apparatus for recirculation of a cathode gas in a fuel cell arrangement having a cathode gas supply for supplying the cathode gas to a cathode area in the fuel cell arrangement, a cathode gas outlet for carrying the partially consumed cathode gas out of the cathode area, and a recirculation guide for recirculation of the partially consumed cathode gas from a junction point in the cathode gas outlet into a supply point in the cathode gas supply. The invention also includes a method for shutting down such a fuel cell arrangement.

Fuel cells are used to convert chemical energy to electrical energy by reacting a fuel (for example, hydrogen) with an oxidant (for example, environmental air) in an electrochemical process. Fuel cells such as these are on the one hand used in a stationary form, and on the other hand, as mobile generators; they provide the capability to supply power to a drive train in a vehicle.

One technical requirement is to accommodate the demanding electrochemical process, on the one hand with the reaction of the fuel being economic and on the other hand with the fuel cell apparatus being operated permanently and operationally safely.

By way of example, German patent document DE 102 03 029 A1 discloses a fuel cell apparatus having a specific configuration of an apparatus for supplying a medium containing oxygen into a cathode area of a fuel cell in the fuel cell apparatus. Cathode gas which has been partially consumed in the electrochemical process is recirculated, starting from a cathode outlet, mixed with fresh cathode gas and then supplied to the cathode input again. The particular advantages of this procedure are that the water which is created during the electrochemical process is fed back through the partially consumed cathode gas and is used to moisturize the sensitive intermediate membrane between the cathode area and the anode area. A controllable restriction apparatus is arranged in a recirculation line, in order to control the proportion of the recirculated, partially consumed cathode gas.

German patent document DE 102 047 87 A1 relates to a flap valve for fuel sets, which is intended to be used in particular in the field of fuel supply (that is, in the anode gas circuit). The flap valve comprises a flap which is arranged within a flow channel and can be pivoted via a moveable shaft, and a seal which is connected to a channel wall and has a so-called pressure pocket.

Another valve apparatus in the form of a bypass valve, disclosed in German patent document DE 103 25 196 B3, includes a switching flap and has a flap plate which can be pivoted by means of a shaft arranged outside the flap plate. To improve the valve sealing, a sealing element is arranged on the circumference of the flap plate and has at least two sealing lips which run parallel to one another. The field of the application is considered to be fuel cells, in particular in the area of the anode gas circuit.

German patent document DE 103 28 246 A1 discloses a further valve which has a valve body mounted by means of a shaft that is passed through. A sealing column is fitted on the valve body in order to seal the shaft, as well as a sealing strip which runs around the edge of the circumference. The sealing strip is interrupted in the circumferential direction in order to allow the shaft to pass through, and to allow the sealing column to be attached.

The fuel cell apparatus according to the German patent document DE 102 03 029 A1 is regarded as the closest prior art.

One object of the present invention is to provide an apparatus for recirculation of a cathode gas in a fuel cell arrangement, which allows the fuel cell arrangement to be shut down safely.

Another object of the invention is to provide a corresponding method for shutting down a fuel cell apparatus which is formed from the apparatus and the fuel cell arrangement.

These and other objects and advantages are achieved by the method and apparatus according to the invention, for recirculation of a cathode gas in a fuel cell arrangement, which apparatus may be suitable and/or designed for use as a mobile energy source, in particular in a vehicle. The fuel cell arrangement preferably has a multiplicity of fuel cells (in particular, more than 100) which are connected in series, for example, in order to produce an adequate output voltage. The fuel cells each have a cathode area and an anode area which are separated from one another by a proton exchange membrane. The totality of the cathode areas and of the anode areas, respectively, is referred to in brief in the following text as the cathode area and anode area respectively.

The apparatus has a cathode gas supply for supplying the cathode gas, such as oxygen or environmental air, to the cathode area in the fuel cell arrangement and, for example, is in the form of a supply line or a tube.

For carrying the partially consumed cathode gas out of the cathode area, the apparatus has a cathode gas outlet which, for example, is also in the form of a line or a tube.

Furthermore, the apparatus has a recirculation guide for recirculation of the partially consumed cathode gas from a junction point in the cathode gas outlet into a supply point in the cathode gas supply. The cathode gas outlet is therefore split at a junction point in the flow direction downstream from the cathode area, with a first flow element being emitted, for example, into the environment and a second flow element being passed via the recirculation guide to the supply point in the cathode gas supply. During normal operation, the partially consumed cathode gas is mixed with fresh cathode gas (for example, from the environment) at the supply point, and is passed to the cathode area again.

According to the invention, a blocking apparatus is proposed which is designed to block the cathode gas supply in a gas-tight manner upstream of the supply point and to block the cathode gas outlet downstream from the junction point. A closed circuit for the partially consumed cathode gas is formed when the blocking apparatus is closed, with the partially consumed cathode gas being passed from the cathode area via the junction point and via the supply point into the cathode area again, with no fresh cathode gas being added.

One consideration on which the invention is based is in this case that the life of fuel cells, in particular for automobile applications, is reduced inter alia by corrosion. Although such corrosion also takes place during operation, it occurs in particular when the fuel cell arrangement is in the rest state.

According to the invention, the recirculation arrangement for the cathode gas in the fuel cell arrangement is modified such that it is possible to circulate the partially consumed cathode gas in a closed circuit through the cathode area during the process of switching off the fuel cell arrangement. In this way, the oxygen which still remains in the partially consumed cathode gas is dissipated thus resulting in oxygen depletion and nitrogen enrichment (as well as other gases) in the partially consumed cathode gas. This measure and the procedure result in the oxygen being extracted from the cathode area and from the cathode gas system, thus preventing or at least reducing the corrosion processes associated with it. A further possible advantage is that little or no oxygen can diffuse into the anode area during the rest phase of the fuel cell arrangement. Thus, it becomes possible effectively to prevent corrosion in the anode area of the fuel cell arrangement while it is shut down.

In one preferred embodiment of the invention, the apparatus has a continuous-flow machine which is designed to recirculate the partially consumed cathode gas when the blocking apparatus is closed. The continuous flow machine is therefore arranged and/or connected for flow purposes such that it can move the partially consumed cathode gas in the closed circuit for the partially consumed cathode gas. The continuous flow machine is preferably also designed to compress the cathode gas when the blocking apparatus is open, so that it carries out a dual function, therefore saving components.

In particular the continuous-flow machine may be a turbocharger which is or can be electrically driven (ETC), although it may also be in the form of a volumetric compressor, such as a screw-type compressor or Roots compressor.

In general, this may also relate to an impulse exchange machine. This embodiment once again underscores the inventive concept of circulating the partially consumed cathode gas when the blocking apparatus is closed, in order to reduce oxygen content.

In one preferred implementation of the invention, the apparatus has a control apparatus, which is in the form of programming and/or circuitry, and is designed to block the blocking apparatus and at the same time to activate the continuous-flow machine, or to keep it activated in a switched-off operating mode. It is also possible for the switched-off operating mode to occur in the course of maintenance, repair or the like.

The control apparatus, which may be in the form of a local control or a part of a higher-level control system, preferably allows a plurality of operating modes, including the switched-off operating mode Preferably, the control apparatus comprises programming and/or circuitry that maintains the switched off operating mode for a defined time interval and/or as a function of the remaining oxygen content in the partially consumed cathode gas. A time interval determined and/or calculated from an empirical value is entered by a user for a defined time interval. For example, appropriate sensors (such as oxygen sensors) are provided in the apparatus for closed-loop or open-loop control as a function of the remaining oxygen content in the partially consumed cathode gas, with the recirculation being deactivated when a limit value is undershot.

Alternatively, the voltage of the fuel cell can also be used as a switch-off criterion since, when no oxygen is present, no voltage is produced either.

In one preferred embodiment of the invention, the blocking apparatus comprises one or more valves or restrictors designed and/or arranged to block the cathode gas outlet and/or the cathode gas supply. The valves may be designed, for example, as in the initially cited in German patent documents DE 102 047 87 A1; DE 103 25 196 B3; or DE 103 28 246 A1, whose disclosure content relating to the physical form is hereby included in its entirety in the present disclosure, by reference.

In one preferred embodiment of the invention, the valve or valves and/or the restrictor or restrictors may be self-latching, particularly in the open and/or closed state. Particularly from the point of view of FMEA aspects, it is preferable in this case for the valves and/or restrictors to be open when no current is applied to an operation and to be closed when no current is flowing after the fuel cell arrangement has been switched off, in order to prevent the ingress of fresh cathode gas or environmental air. One possible implementation of the self-latching valves or restrictors is for these devices to be driven via a worm drive, in particular a self-locking worm drive.

In order to minimize the number of active components, all the valves and/or restrictors of the blocking apparatus preferably may be driven by a common actuator, such as for example, a linkage, a common shaft or a Bowden cable, in order to mechanically couple the valves and restrictors. In the alternative, each valve and each restrictor can also be allocated a separate actuator.

At least one of the restrictors in the blocking apparatus preferably has a restrictor valve and optionally a restrictor valve housing, with the restrictor valve being sealed with respect to the restrictor valve housing and the gas-carrying lines by means of an elastic sealing system. In this case, on the one hand, it is possible to seal the restrictor by means of a circumferential seal on a sealing disc of the restrictor valve and/or for the restrictor valve housing to be rubber-coated internally, in particular in those areas on which the restrictor valve rests in the closed state.

In a modification of the invention, the blocking apparatus may have a pressure maintenance mechanism, such as a pressure maintenance valve, preferably in the form of a restrictor or control valve and/or a proportional valve, which carries out the function of blocking the cathode gas outlet. This arrangement allows a pressure maintenance mechanism which already exists on the cathode outlet side in the fuel cell apparatus to be modified in a simple manner, in order to integrate the additional functionality of blocking the gas flow. In this embodiment, only one blocking device is required to block the cathode gas supply.

The invention further relates to a fuel cell apparatus that is designed in particular for a vehicle, and comprises the above-described fuel cell arrangement, including the apparatus for recirculation.

The invention also provides a method for switching off or shutting down a fuel cell apparatus, in which, when the fuel cell apparatus is being switched off, the blocking apparatus is switched so that the partially consumed gas circulates in a closed circuit through the cathode area.

For open-loop and/or closed-loop control purposes, the partially consumed cathode gas is preferably circulated until the oxygen in the cathode gas is consumed, or has fallen below a limit value.

Other objects, advantages and novel features of the present invention will become apparent from the following detailed description of the invention when considered in conjunction with the accompanying drawings.

BRIEF DESCRIPTION OF THE DRAWINGS

FIG. 1 shows a schematic block diagram of a fuel cell apparatus, as a first exemplary embodiment of the invention.

DETAILED DESCRIPTION OF THE DRAWINGS

Referring now to FIG. 1, a fuel cell apparatus 1 includes an apparatus for recirculation 2 as one exemplary embodiment of the invention. The fuel cell apparatus 1 comprises a fuel cell stack 3 which has a plurality of fuel cells (at least one fuel cell). The fuel cell stack 3 comprises an anode area 4 and a cathode area 5, which are separated from one another by a membrane 6 (PEM). In order to supply the cathode area 5, the fuel cell apparatus 1 has a cathode gas supply 7 whose input is connected to the environment or to an oxygen tank, and whose output opens in the cathode area 5. Originating from the environment or the oxygen tank, an oxidant mass flow is passed via the cathode gas supply 7 into the cathode area 5, in order to carry out an electrochemical reaction there, in a known manner, with a fuel in the anode area 4, in order to produce electrical energy. A compressor 8 is arranged in the cathode gas supply 7 in order to compress the supplied gas, and may be in the form of a volumetric or impulse exchange machine, or particularly preferably a continuous-flow machine (turbocharger or turbocompressor). The gas is compressed using the dynamic principle, in which energy transmission preferably takes place via an impeller with blades, through which flow passes continuously.

The partially consumed cathode gas which is carried out of the cathode area 5 after the electrochemical reaction is at least partially dissipated into the environment via a cathode gas outlet 9 originating from the cathode area 5.

In order to recirculate the partially consumed cathode gas, downstream from the cathode area 5 the outlet line 9 has a junction point 10, to which is connected to a recirculation guide 11. The recirculation guide 11 connects the junction point 10 to a supply point 12 in the cathode gas supply 7. The supply point 12 is arranged upstream from the continuous-flow machine 8 in the flow direction (that is, on the suction side of the continuous-flow machine). A portion of the partially consumed cathode gas is therefore tapped off through the recirculation guide 11 and is added to the fresh cathode gas flow, with this mixture being compressed as the working gas in the continuous-flow machine 8 and finally being supplied to the cathode area 5.

During normal operation of the fuel cell apparatus 1, the recirculation guide 11 is provided with closed-loop or open-loop control via a valve 13 as a function of the required moisture or the mass flow of the oxidant. For example, the recirculation apparatus 2 is switched when the fuel cell apparatus 1 is being shut down or switched off such that the partially consumed cathode gas is circulated in a closed circuit through the cathode area 5 without fresh cathode gas being supplied, in order to completely or nearly completely dissipate the oxygen remaining in the partially consumed cathode gas.

In order to carry out the switching process, the fuel cell apparatus 1 has a control apparatus 14 which is designed to control an input restrictor 15 and an output restrictor 16, as well as the continuous-flow machine 8. The input restrictor 15 is arranged in the flow upstream of the supply point 12 in the cathode gas supply 7 and makes it possible to block the cathode gas supply 7 in a gas tight manner such that no fresh cathode gas can be supplied in the direction of the cathode area 5. The output restrictor 16 is arranged in the flow downstream from the junction point 10 and allows the cathode gas outlet to be blocked in a gas-tight manner, so that no fresh cathode gas or environmental air can enter in the direction of the cathode area 5 from this side either.

The input and/or output restrictors 15, 16 each have, for example, a restrictor valve which is provided with an elastic seal that ensures adequate, gas-tight sealing of the components. For example, one such restrictor valve has a circumferential seal. Alternatively or additionally, the input and/or output restrictors 15, 16 have a restrictor valve housing which is provided with a rubber coating for sealing purposes in the contact area with the restrictor valve.

Each of the restrictors 15, 16 may have its own actuator for drive purposes, or alternatively and advantageously a common actuator can be provided for control purposes—since these two restrictors are each switched at the same time—and passes the control movements to the restrictors 15, 16 by cables, linkages or the like.

Once a switched-off operating mode has been activated, the control apparatus 14 closes the input restrictor 15 and the output restrictor 16 and activates the continuous-flow machine 8, resulting in recirculation of the partially consumed cathode gas via the cathode area 5 and the recirculation guide 11. This recirculation is continued until the oxygen in the partially consumed cathode or recirculation gas has been adequately dissipated by electrochemical or catalytic processes. The control apparatus 14 then switches off the continuous-flow machine 8.

This switching-off procedure ensures that no oxygen (or only a small residual amount of oxygen) remains in the cathode-side area of the fuel cell apparatus 1. Furthermore, it also ensures that no oxygen can diffuse from the cathode area 5 into the anode area 4, thus also resulting in an oxygen-free or low-oxygen area there. In consequence, the fuel cell apparatus 1 is switched by the proposed apparatus and the proposed method to have little or no oxygen, so that corrosion processes are prevented, or are at least greatly diminished, and the life of the fuel cell apparatus 1 (and in particular of the membrane 6) can be considerably lengthened.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for recirculation of a cathode gas in a fuel cell arrangement having a cathode gas supply for supplying the cathode gas to a cathode area in the fuel cell arrangement, and a cathode gas outlet for carrying partially consumed cathode gas out of the cathode area; said apparatus comprising:
   a recirculation guide for recirculating at least a portion of the partially consumed cathode gas from a junction point in the cathode gas outlet into a supply point in the cathode gas supply, wherein the junction and supply points are arranged within the recirculation guide; and
   first and second blocking elements arranged outside of the recirculation guide, wherein the first blocking element is arranged in a flow direction upstream of the supply point and is configured to block the cathode gas supply, and the second blocking element is arranged in a flow direction downstream from the junction point and is configured to block the cathode gas outlet, wherein the first and second blocking elements are configured such that a closed circuit for the partially consumed cathode gas is formed when the first and second blocking elements are closed; wherein,
   the first and second blocking elements each comprise at least one of a valve and a restrictor;
   the first and second blocking elements are self-latching;
   the first and second blocking elements are driven via a worm drive; and
   the first and second blocking elements are driven by a common mechanical actuator.

2. The apparatus according to claim 1, comprising a continuous-flow machine configured to recirculate the partially consumed cathode gas when the blocking apparatus is closed.

3. The apparatus according to claim 2, wherein the continuous-flow machine is an electrically driven turbocharger.

4. The apparatus according to claim 2, wherein the continuous-flow machine comprises a volumetric compressor.

5. The apparatus according to claim 4, wherein the volumetric compressor is one of a screw-type compressor and a Roots compressor.

6. The apparatus according to claim 1, further comprising a control apparatus which is configured and located to block the blocking apparatus and to activate the continuous-flow machine in a switched-off operating mode of said fuel cell arrangement.

7. The apparatus according to claim 6, wherein the control apparatus is configured to maintain the switched-off operating mode for a time interval that is one of preset and a function of the remaining oxygen content in the partially consumed cathode gas.

8. The apparatus according to claim 1, comprising at least one restrictor that has a restrictor valve, the restrictor being sealed by one of i) a circumferential seal on a sealing disc of the restrictor valve, and ii) an internally rubber-coated restrictor valve housing.

9. The apparatus according to claim 1, wherein the blocking apparatus has a pressure maintenance mechanism that is arranged in the cathode gas outlet, in the flow direction downstream from the junction point, and is configured to block the cathode gas outlet.

10. A fuel cell apparatus for a vehicle, having a recirculation apparatus according to claim 1.

11. The apparatus according to claim 1, wherein the partially consumed cathode gas is circulated until the residual oxygen in the cathode gas is consumed, or has fallen below a limit value.

* * * * *